US012579705B2

(12) United States Patent
Li et al.

(10) Patent No.: US 12,579,705 B2
(45) Date of Patent: Mar. 17, 2026

(54) GENERATIVE MODEL FINE-TUNING BASED ON PERFORMANCE AND QUALITY

(71) Applicant: Google LLC, Mountain View, CA (US)

(72) Inventors: Yinxiao Li, Sunnyvale, CA (US); Xiaohang Li, Cupertino, CA (US); Junjie Ke, San Jose, CA (US); Feng Yang, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 154 days.

(21) Appl. No.: 18/643,342

(22) Filed: Apr. 23, 2024

(65) Prior Publication Data

US 2025/0329062 A1      Oct. 23, 2025

(51) Int. Cl.
*G06T 11/00* (2006.01)

(52) U.S. Cl.
CPC .................................... *G06T 11/00* (2013.01)

(58) Field of Classification Search
None
See application file for complete search history.

(56) References Cited

U.S. PATENT DOCUMENTS

2025/0124730 A1 * 4/2025 Du .......................... G06V 10/44

FOREIGN PATENT DOCUMENTS

| CN | 116051668 B | 9/2023 |
| CN | 116776420 A | 9/2023 |
| CN | 116883530 A | 10/2023 |

OTHER PUBLICATIONS

Dombrowski, M., et al., "Trade-Offs in Fine-Tuned Diffusion Models between Accuracy and Interpretability", Proceedings of the AAAI Conference on Artificial Intelligence. vol. 38. No. 19., Mar. 2024. 9 pages.
Fan, Y., et al., "DPOK" Reinforcement Learning for Fine-tuning Text-to-Image Diffusion Models, Advances in Neural Information Processing Systems 36, Feb. 2024. 28 pages.
Lu, H., et al., "Specialist Diffusion: Plug-and-Play Sample-Efficient Fine-Tuning of Text-to-Image Diffusion Models to Learn and Unseen Style", 2023 IEEE/CVF Conference on Computer Vision and Pattern Recognition (CVPR). IEEE, Jun. 2023. 10 pages.
Moon, T., et al., "Fine-tuning Diffusion Models with Limited Data", NeurIPS 2022 Workshop on Score-Based Methods, Nov. 2022. 14 pages.
Qiu, Z., et al., "Controlling Text-to-Image Diffusion by Orthogonal Finetuning", Advances in Neural Information Processing Systems 36, Dec. 2023. 43 pages.
(Continued)

*Primary Examiner* — Frank S Chen
(74) *Attorney, Agent, or Firm* — Lerner David LLP

(57) ABSTRACT

Aspects of the disclosure are directed to text to image generative models fine-tuned to generate images that account for performance in addition to quality. For example, in a digital content domain, the generated images can be not only visually appealing but perform well as advertising assets, e.g., result in improved click through rate and/or conversion rate. Accounting for performance and quality can reduce processing cost and memory usage when generating images from text prompts, as the resolution of the image can be balanced with its function, allowing for reduced quality images that can still perform well.

12 Claims, 5 Drawing Sheets

Text Prompt 104: "A man and a woman are lying on a pink inflatable mattress in a field of flowers. The man is wearing a white suit and the woman is wearing a green suit. They are both smiling."

100

Output Image 106

Text to Image Generative Model 102

Generation Loss 108      Performance Loss 110      Quality Loss 112

(56) References Cited

OTHER PUBLICATIONS

Ruiz, N., et al., "DreamBooth: Fine Tuning Text-to-Image Diffusion Models for Subject-Driven Generation", Proceedings of the IEEE/CVF Conference on Computer Vision and Pattern Recognition. Jun. 2023. 11 pages.

Xie, E., et al., "DiffFit: Unlocking Transferability of Large Diffusion Models via Simple Parameter-Efficient Fine-Tuning", Proceedings of the IEEE/CVF International Conference on Computer Vision, Apr. 2023. 10 pages.

* cited by examiner

500

GENERATIVE MODEL FINE-TUNING BASED ON PERFORMANCE AND QUALITY

BACKGROUND

Generative models that generate images from text prompts have enabled the creation of captivating visual assets from textual descriptions. This technology has found widespread application in both personal and commercial domains. In a digital content domain, images can serve beyond their aesthetic appeal to become strategic tools for increasing commercial outcomes, such as increasing clicks and conversions in advertising. However, existing generative models primarily prioritize generating realistic-looking images without considering performance metrics.

BRIEF SUMMARY

Aspects of the disclosure are directed to text to image generative models fine-tuned to generate images that account for performance as well as improving visual quality. For example, in a digital content domain, the generated images can be not only visually appealing but perform well as advertising assets, e.g., result in improved click through rate and/or conversion rate. Accounting for performance and quality can reduce processing cost and memory usage when generating images from text prompts, as the resolution of the image can be balanced with its function, allowing for reduced quality images that can still perform well, according to various performance metrics.

An aspect of the disclosure provides for a method for fine-tuning a text to image generative model including: receiving, by one or more processors, training data; processing, by the one or more processors, the training data using the generative model to output results; determining, by the one or more processors, a generation loss, a performance loss, and a quality loss for the generative model based on the results; and updating, by the one or more processors, the generative model based on the generation loss, performance loss, and quality loss.

Another aspect of the disclosure provides for a system including: one or more processors; and one or more storage devices coupled to the one or more processors and storing instructions that, when executed by the one or more processors, cause the one or more processors to perform operations for the method for fine-tuning a text to image generative model. Yet another aspect of the disclosure provides for a computer readable medium for storing instructions that, when executed by one or more processors, cause the one or more processors to perform operations for the method for fine-tuning a text to image generative model.

In an example, the training data includes pairs of images and text captions. In another example, processing the training data further includes: diffusing the images with noise; and recovering images based on the text captions. In yet another example, determining a generation loss, a performance loss, and a quality loss comprises comparing the recovered image with the image received as part of the training data. In yet another example, the training data includes, for at least one pair of an image and a text caption in the training data, a respective threshold generation score, a respective threshold performance score, and a respective threshold quality score.

In yet another example, the method further includes combining, by the one or more processors, the generation loss, performance loss, and quality loss. In yet another example, updating the generative model is based on reducing generation loss, performance loss, and quality loss.

In yet another example, the processing, determining, and updating are iterative. In yet another example, the processing, determining, and updating are performed after the generative model is pretrained. In yet another example, the method further includes outputting, by the one or more processors, a fine-tuned text to image model after iteratively performing the processing, determining, and updating for a number of iterations.

DETAILED DESCRIPTION

Figure 1:
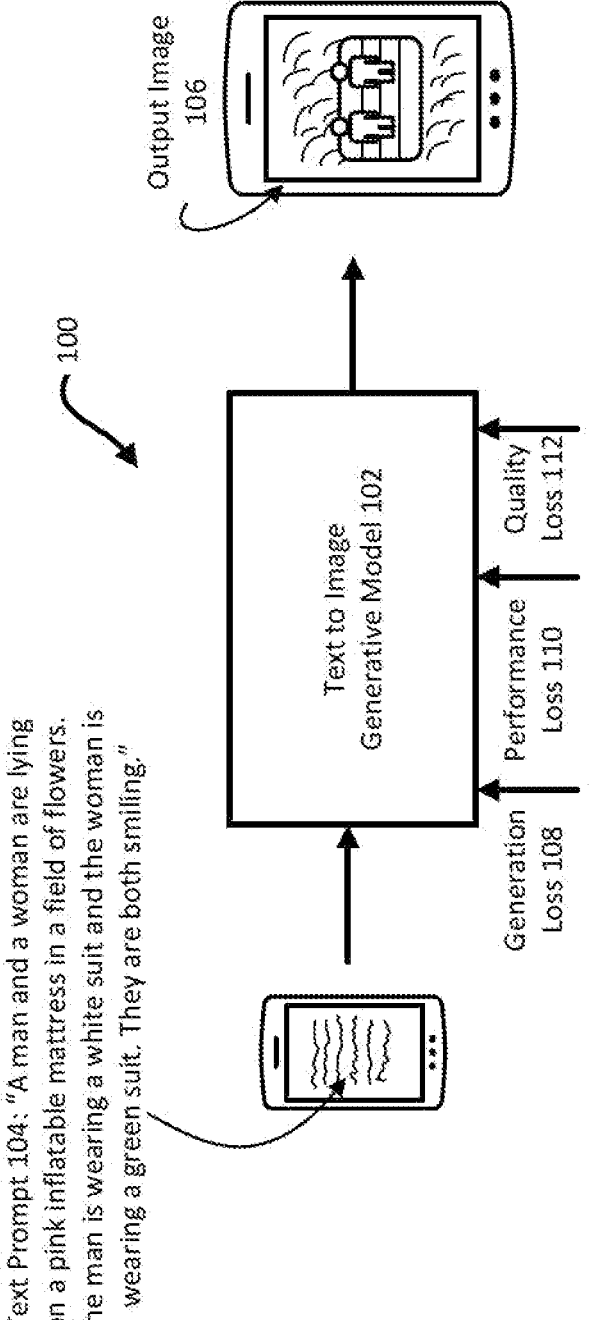
FIG. 1 depicts a block diagram of an example text to image generator according to aspects of the disclosure.

The technology generally relates to fine-tuning text to image generative models based on generation, performance, and quality loss functions. Text to image generative models are trained on pairs of images and text captions. The images are diffused with controlled noise and the model learns to recover the image based on the text caption as conditioning. In learning to recover the image, the model is trained to reduce, e.g., minimize, generation loss as well as performance loss and quality loss.

Generation loss is the loss for training text-to-image diffusion models. The goal of the generation loss is to increase, e.g., maximize, a log-likelihood of the sample generated, at the end of the reverse process, belonging to the original data distribution. An example form of generation loss could be mean-square-error loss of the predicted noise. Performance loss is the loss for increasing, e.g., maximizing, the estimated performance score of the generated image. Performance score can refer to how well the model performed with respect to a particular task, such as increasing clicks and conversions for digital content. The performance score estimation can be provided by a pretrained performance estimation model. Quality loss is the loss for increasing, e.g., maximizing, the estimated quality score of the generated image. Quality score can refer to a visual quality of the image. The quality score estimation can be provided by a pretrained quality estimation model. Any tradeoff among the generation loss, performance loss, and quality loss can be controlled by weighting the respective losses with linear combinations.

Performance loss and quality loss can be determined by respectively adding a performance label and quality label to the pairs of images and text captions. Alternatively, or additionally, performance loss and quality loss can be determined by implementing a pre-trained performance prediction model and/or quality prediction model. The performance prediction model and/or quality prediction model can formulate a loss function to increase, e.g., maximize, a predicted performance score and quality score. The loss function can be a combination of generation loss, performance loss, and quality loss, such as a linear combination or weighted linear combination. The loss function can be utilized for backpropagation to update model parameter values of the text to image generative model.

The generative model is trained with different noise steps in training, resulting in an output image that can be noisy in earlier time steps or could be mostly clean in later time steps. Since the performance score and quality score can be pretrained on clean images without added noise, these models may not perform well on noisy images due to the distribution shift. Further, the measurement of performance or quality may not be helpful when the images are noisy. Therefore, performance loss and quality loss is incorporated in later time steps, such as 0.9 to 1.0.

Unlike other training approaches that only involve the image generation loss, the loss function utilized in training the model is modified to include performance loss and quality loss. Further, since the diffusion training process can produce noisier images initially, the loss function can be incorporated later into the training process, such as after a threshold number of iterations, after a threshold amount of time, and/or after a realistic image is generated. Performance and quality loss can be added on images that have been fully generated, such as images that look realistic and have a minimal amount of noise. Later time steps, such as 0.9 to 1.0 can be sufficient for starting to account for the performance and quality loss. Essentially, the generative model can learn to generate realistic images first and then can be fine-tuned to generate higher quality and higher performance images. Incorporating the loss function during the later iterations can ensure the loss is applied to more refined images, enhancing the stability and overall effectiveness of the training process as well as producing less artifacts.

FIG. 1 depicts a block diagram of an example text to image generator 100. The text to image generator 100 can include one or more text to image generative models 102. The generative models 102 can be fine-tuned to the task of generating images 106 from text prompts 104 based on generation loss 108, performance loss 110, and quality loss 112. The generative models 102 can be trained based on labels or pretrained models to reduce, e.g., minimize, generation loss 108, performance loss 110, and quality loss 112. Example generative models can include large generative models, such as large language models, large foundation models, and/or large graphical models.

The generative models 102 can receive a text prompt 104 to generate one or more images. The prompt 104 can include a description of the image at any level of detail, such as ranging from a single sentence to detailed paragraphs. The prompt 104 can further include a purpose for the image, such as utilizing the image for digital content like advertising. For example, as depicted in FIG. 1, the text prompt 104 can describe "A man and a woman are lying on a pink inflatable mattress in a field of flowers. The man is wearing a white suit and the woman is wearing a green suit. They are both smiling." In response to the text prompt 104, the generative models 102 can output one or more images 106. The one or more images 106 can visually represent the text prompt 104. For example, as depicted in FIG. 1, based on the description of the text prompt 104, the generative models 102 output an image 106 of a man and a woman lying on a pink inflatable mattress in a field of flowers, where the man is wearing a white suit, the woman is wearing a green suit, and they are both smiling.

Figure 2:
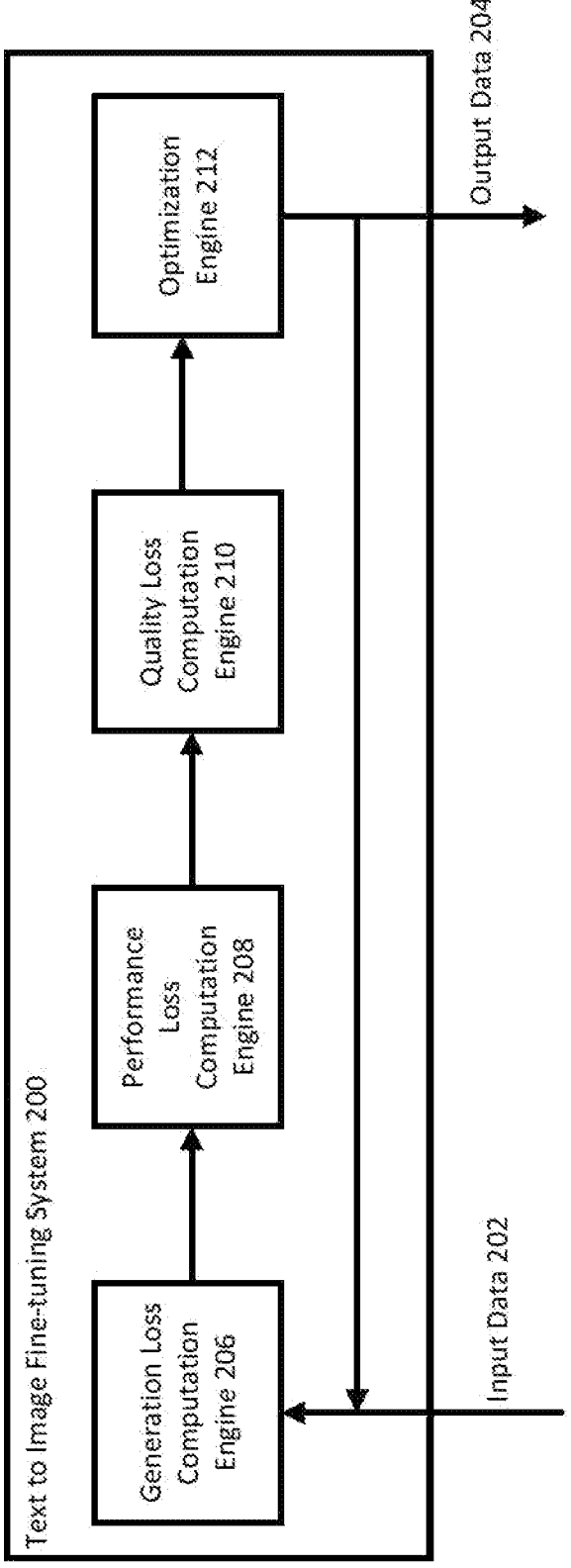
FIG. 2 depicts a block diagram of an example text to image fine-tuning system according to aspects of the disclosure.

FIG. 2 depicts a block diagram of a text to image fine-tuning system 200 for fine-tuning one or more text to image generative models. The text to image fine-tuning system 200 can be implemented on one or more computing devices in one or more locations.

The text to image fine-tuning system 200 can be configured to receive input data 202. For example, the text to image fine-tuning system 200 can receive the input data 202 as part of a call to an application programming interface (API) exposing the text to image fine-tuning system 200 to one or more computing devices. The input data 202 can also be provided to the text to image fine-tuning system 200 through a storage medium, such as remote storage connected to the one or more computing devices over a network. The input data 202 can further be provided as input through a user interface on a client computing device coupled to the text to image fine-tuning system 200. The user interface can include a natural language interface, such as one or more text boxes, and/or a graphical interface, such as one or more sliders, checkboxes, and/or templates.

The input data 202 can include training data for fine-tuning a text to image generative model. The training data can include pairs of images and text captions. The text captions can describe the images with which they are paired. The training data can further include one or more parameters for training the generative model, including learning rate, number of training iterations, batch size, as examples. The training data can also include conditions to account for when training the generative model, including performance score, quality score, context images, and/or image crop boundaries.

From the input data 202, the text to image fine-tuning system 200 can be configured to output one or more results generated as output data 204. The output data 204 can include a trained generative model that can output images from text prompts, accounting for both performance and quality. As an example, the text to image fine-tuning system 200 can be configured to send the output data 204 for display on a client or user display. As another example, the text to image fine-tuning system 200 can be configured to provide the output data 204 as a set of computer-readable instructions, such as one or more computer programs. The computer programs can be written in any type of programming language, and according to any programming paradigm, e.g., declarative, procedural, assembly, object-oriented, data-oriented, functional, or imperative. The computer programs can be written to perform one or more different functions and to operate within a computing environment, e.g., on a physical device, virtual machine, or across multiple devices. The computer programs can also implement functionality described herein, for example, as performed by a system, engine, module, or model. The text to image fine-tuning system 200 can further be configured to forward the output data 204 to one or more other devices configured for translating the output data into an executable program written in a computer programming language. The text to image fine-tuning system 200 can also be configured to send the output data 204 to a storage device for storage and later retrieval.

The text to image fine-tuning system 200 can include a generation loss computation engine 206, a performance loss computation engine 208, a quality loss computation engine 210, and an optimization engine 212. The generation loss computation engine 206, performance loss computation engine 208, quality loss computation engine 210, and optimization engine 212 can be implemented as one or more computer programs, specially configured electronic circuitry, or any combination thereof. The generation loss computation engine 206, performance loss computation engine 208, quality loss computation engine 210, and optimization engine 212 can perform training iterations to fine-tune a text to image generative model based on generation loss, performance loss, and quality loss. Although described as fine-tuning a pretrained text to image generative model, it is understood that in some examples, a text to image generative model can be pretrained and fine-tuned using the various losses described herein.

The generation loss computation engine 206 can be configured to calculate generation loss. Generation loss is the loss for training text-to-image diffusion models and measures how well the generated image aligns with an inputted training image. The goal of the generation loss is to increase, e.g., maximize, a log-likelihood of the sample generated at the end of the reverse process belonging to the original data distribution. The generation loss computation engine 206 can calculate generation loss by adding a generation label to the pairs of images and text captions. Alternatively, or additionally, the generation loss computation engine 206 can implement a prediction model pretrained to the task of formulating a generation loss function that increases, e.g., maximizes, a generation score. Although described as increasing, e.g., maximizing, a generation score, it is understood that a loss function may be formulated and the model trained so as to reward reducing, e.g., minimizing, the generation score and/or other losses described herein.

The performance loss computation engine 208 can be configured to calculate performance loss. Performance loss increases, e.g., maximizes, the estimated online performance, such as clicks or conversions in digital content. The performance loss computation engine 208 can calculate performance loss by adding a performance label to the pairs of images and text captions. Alternatively, or additionally, the performance loss computation engine 208 can implement a prediction model pre-trained to the task of formulating a performance loss function that increases, e.g., maximizes, a performance score.

The quality loss computation engine 210 can be configured to calculate quality loss. Quality loss increases, e.g., maximizes, an estimated aesthetic quality, such as how well the image looks visually. The quality loss computation engine 208 can calculate quality loss by adding a quality label to the pairs of images and text captions. Alternatively, or additionally, the quality loss computation engine 208 can implement a prediction model pre-trained to the task of formulating a quality loss function that increases, e.g., maximizes, a quality score.

The optimization engine 212 can be configured to update the text to image generative model based on the calculated generation loss, performance loss, and quality loss. For example, for the initial and subsequent training iterations, the optimization engine 212 can update model weights from the initial or previously updated model weights based on the calculated loss. The optimization engine 212 can send the updated model weights back to the generation loss computation engine 206 or can output the updated model weights as output data 204. The optimization engine 212 can further be configured to combine the generation loss, performance loss, and quality loss into a combined loss, such as a linear combination or weighted linear combination. The optimization engine 212 can update the model weights based on the combined loss.

Figure 3:
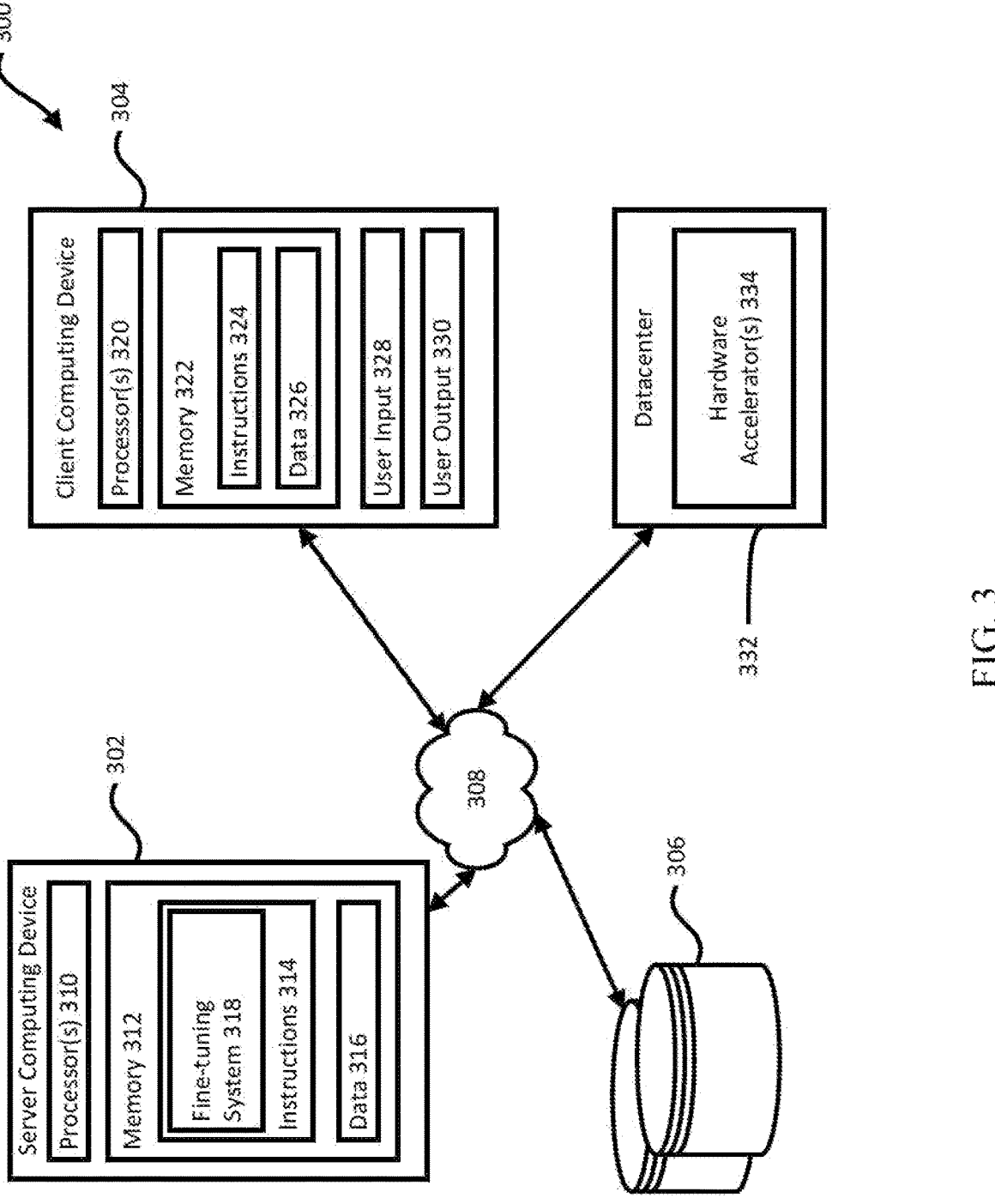
FIG. 3 depicts a block diagram of an example environment for implementing a text to image fine-tuning system according to aspects of the disclosure.

FIG. 3 depicts a block diagram of an example environment 300 for implementing a text to image fine-tuning system 318. The text to image fine-tuning system 318 can be implemented on one or more devices having one or more processors in one or more locations, such as in server computing device 302. Client computing device 304 and the server computing device 302 can be communicatively coupled to one or more storage devices 306 over a network 308. The storage devices 306 can be a combination of volatile and non-volatile memory and can be at the same or different physical locations than the computing devices 302, 304. For example, the storage devices 306 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 302 can include one or more processors 310 and memory 312. The memory 312 can store information accessible by the processors 310, including instructions 314 that can be executed by the processors 310. The memory 312 can also include data 316 that can be retrieved, manipulated, or stored by the processors 310. The memory 312 can be a type of transitory or non-transitory computer readable medium capable of storing information accessible by the processors 310, such as volatile and non-volatile memory. The processors 310 can include one or more central processing units (CPUs), graphic processing units (GPUs), field-programmable gate arrays (FPGAs), and/or application-specific integrated circuits (ASICs), such as tensor processing units (TPUs).

The instructions 314 can include one or more instructions that, when executed by the processors 310, cause the one or more processors 310 to perform actions defined by the instructions 314. The instructions 314 can be stored in object code format for direct processing by the processors 310, or in other formats including interpretable scripts or collections of independent source code modules that are interpreted on demand or compiled in advance. The instructions 314 can include instructions for implementing a text to image fine-tuning system 318, which can correspond to the text to image fine-tuning system 200 as depicted in FIG. 2. The text to image fine-tuning system 318 can be executed using the processors 310, and/or using other processors remotely located from the server computing device 302.

The data 316 can be retrieved, stored, or modified by the processors 310 in accordance with the instructions 314. The data 316 can be stored in computer registers, in a relational or non-relational database as a table having a plurality of different fields and records, or as JSON, YAML, proto, or XML documents. The data 316 can also be formatted in a computer-readable format such as, but not limited to, binary values, ASCII, or Unicode. Moreover, the data 316 can include information sufficient to identify relevant information, such as numbers, descriptive text, proprietary codes, pointers, references to data stored in other memories, including other network locations, or information that is used by a function to calculate relevant data.

The client computing device 304 can also be configured similarly to the server computing device 302, with one or more processors 320, memory 322, instructions 324, and data 326. The client computing device 304 can also include a user input 328 and a user output 330. The user input 328 can include any appropriate mechanism or technique for receiving input from a user, such as keyboard, mouse, mechanical actuators, soft actuators, touchscreens, microphones, and sensors.

The server computing device 302 can be configured to transmit data to the client computing device 304, and the client computing device 304 can be configured to display at least a portion of the received data on a display implemented as part of the user output 330. The user output 330 can also be used for displaying an interface between the client computing device 304 and the server computing device 302. The user output 330 can alternatively or additionally include one or more speakers, transducers or other audio outputs, a haptic interface or other tactile feedback that provides non-visual and non-audible information to the platform user of the client computing device 304.

Although FIG. 3 illustrates the processors 310, 320 and the memories 312, 322 as being within the respective computing devices 302, 304, components described herein can include multiple processors and memories that can operate in different physical locations and not within the same computing device. For example, some of the instructions 314, 324 and the data 316, 326 can be stored on a removable SD card and others within a read-only computer chip. Some or all of the instructions 314, 324 and data 316, 326 can be stored in a location physically remote from, yet still accessible by, the processors 310, 320. Similarly, the processors 310, 320 can include a collection of processors that can perform concurrent and/or sequential operation. The computing devices 302, 304 can each include one or more internal clocks providing timing information, which can be used for time measurement for operations and programs run by the computing devices 302, 304.

The server computing device 302 can be connected over the network 308 to a data center 332 housing any number of hardware accelerators 334. The data center 332 can be one of multiple data centers or other facilities in which various types of computing devices, such as hardware accelerators, are located. Computing resources housed in the data center 332 can be specified for deploying models, such as for text to image generation, as described herein.

The server computing device 302 can be configured to receive requests to process data from the client computing device 304 on computing resources in the data center 332. For example, the environment 300 can be part of a computing platform configured to provide a variety of services to users, through various user interfaces and/or application programming interfaces (APIs) exposing the platform services. As an example, the variety of services can include text to image generation. The client computing device 304 can transmit input data as part of a query for a task to generate an image from a text prompt, such as generating digital content for display in a web space. The text to image fine-tuning system 318 can receive the input data, and in response, generate output data including a response to the query including the generated image that accounts for performance and quality.

The server computing device 302 can maintain a variety of models in accordance with different constraints available at the data center 332. For example, the server computing device 302 can maintain different families for deploying models on various types of TPUs and/or GPUs housed in the data center 332 or otherwise available for processing.

Figure 4:
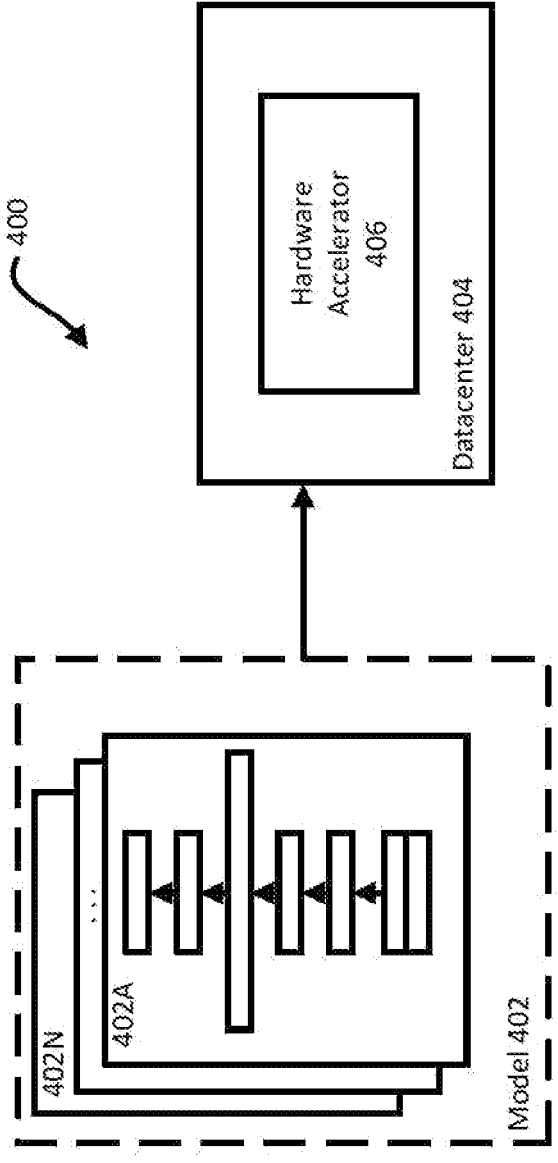
FIG. 4 depicts a block diagram of one or more machine learning model architectures according to aspects of the disclosure.

FIG. 4 depicts a block diagram 400 illustrating one or more machine learning model 402 architectures, more specifically 402A-N for each architecture, for deployment in a datacenter 404 housing a hardware accelerator 406 on which the deployed machine learning models 402 will execute, such as for the variety of services as described herein. The hardware accelerator 406 can be any type of processor, such as a CPU, GPU, FPGA, or ASIC such as a TPU.

An architecture of a machine learning model 402 can refer to characteristics defining the model, such as characteristics of layers for the model, how the layers process input, or how the layers interact with one another. The architecture of the machine learning model 402 can also define types of operations performed within each layer. One or more machine learning model 402 architectures can be generated that can output results, such as for text to image generation. Example model architectures can correspond to generative models, such as language models, foundation models, and/or graphical models. Example model architectures for diffusion models can include stochastic differential equations (SDEs), score-based generative models (SGMs), denoising diffusion probabilistic models (DDPMs), as well as various encoders and decoders to processing latent representations of input images. In some examples, the diffusion model may process input using either latent space representation and/or a pixel space representation of the input.

The machine learning models can be trained according to a variety of different learning techniques. Learning techniques for training the machine learning models can include supervised learning, unsupervised learning, semi-supervised learning, and reinforcement learning techniques. For example, training data can include multiple training examples that can be received as input by a model. The training examples can be labeled with a desired output for the model when processing the labeled training examples. The label and the model output can be evaluated through a loss function to determine an error, which can be back propagated through the model to update weights for the model. For example, a supervised learning technique can be applied to calculate an error between outputs, with a ground-truth label of a training example processed by the model. Any of a variety of loss or error functions appropriate for the type of the task the model is being trained for can be utilized, such as cross-entropy loss for classification tasks, or mean square error for regression tasks. The gradient of the error with respect to the different weights of the candidate model on candidate hardware can be calculated, for example using a backpropagation algorithm, and the weights for the model can be updated.

As another example, with respect to reinforcement learning, situations encountered by an agent, e.g., a model, a computing device, a system, a robot, etc., are mapped to actions taken by the agent in those situations to maximize the reward or value of its actions. The agent can interact with an environment through its actions. At any given time or point at which the agent is able to act, the environment can be represented as a state. The state can include any information or features about the environment that can be known by the agent. The value of a state is a measure of the total amount of reward the agent can receive from the current state and future states accessible from the current state. A value function can be defined or estimated for calculating, predicting, or estimating the value of a state. Techniques for training a machine learning model via reinforcement learning can focus on estimating or learning value functions to accurately predict value across different states of an environment.

The agent applies a policy to determine an action to take given the state of the environment. The policy can be stochastic, deterministic, or a mixture of the two. The agent can be provided a reward signal or value in response to performing the action, which can be positive, negative, or neutral. The action taken by the agent can advance the environment to a new state with an objective being to maximize the value of a state brought upon by the agent performing an action. Example reinforcement learning techniques include multi-armed bandits, Markov decision processes, Monte Carlo methods, policy gradient methods, and/or other approximate solution methods. Other approaches in reinforcement learning may not rely on estimating value functions.

The model or policy can be modified or updated until stopping criteria are met, such as a number of iterations for training, a maximum period of time, a convergence of estimated rewards or value between actions, or when a minimum value threshold is met.

Referring back to FIG. 3, the devices 302, 304 and the data center 332 can be capable of direct and indirect communication over the network 308. For example, using a network socket, the client computing device 304 can connect to a service operating in the data center 332 through an Internet protocol. The devices 302, 304 can set up listening sockets that may accept an initiating connection for sending and receiving information. The network 308 can include various configurations and protocols including the Internet, World Wide Web, intranets, virtual private networks, wide area networks, local networks, and private networks using communication protocols proprietary to one or more companies. The network 308 can support a variety of short- and long-range connections. The short- and long-range connections may be made over different bandwidths, such as 2.402 GHz to 2.480 GHz, commonly associated with the Bluetooth® standard, 2.4 GHz and 5 GHZ, commonly associated with the Wi-Fi® communication protocol; or with a variety of communication standards, such as the LTE® standard for wireless broadband communication. The network 308, in addition or alternatively, can also support wired connections between the devices 302, 304 and the data center 332, including over various types of Ethernet connection.

Although a single server computing device 302, client computing device 304, and data center 332 are shown in FIG. 3, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing machine learning models, or any combination thereof.

Figure 5:
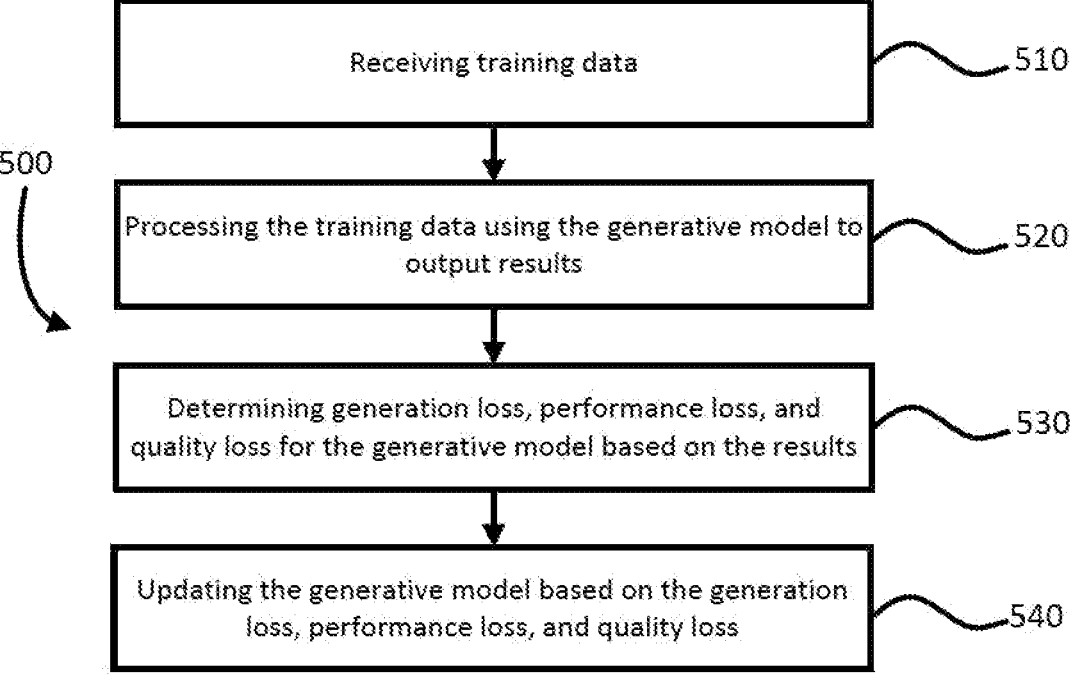
FIG. 5 depicts a flow diagram of an example process for fine-tuning a text to image generative model according to aspects of the disclosure.

FIG. 5 depicts a flow diagram 500 for fine-tuning a text to image generative model. The example process 500 can be performed on a system of one or more processors in one or more location, such as the text to image fine-tuning system 200 as depicted in FIG. 2.

As shown in block 510, the fine-tuning system 200 receives training data. The training data can include pairs of images and text captions. The training data can further include conditions, such as a threshold generation score, a threshold performance score, and/or a threshold quality score.

As shown in block 520, the fine-tuning system 200 processes the training data using the generative model to output results. Processing the training data can further include diffusing the images with noise and using the generative model to recover the images based on the text captions.

As shown in block 530, the fine-tuning system 200 determines a generation loss, a performance loss, and a quality loss for the generative model based on the results. Determining the generation loss, performance loss, and quality loss can include comparing the recovered images with the image received as part of the training data. The fine-tuning system 200 can further combine the generation loss, performance loss, and quality loss into a combined loss. The fine-tuning system 200 can determine the generation loss, performance loss, and quality loss by respectively adding a generation label, performance label, and quality label to the pairs of images and text captions. Alternatively, or additionally, the fine-tuning system 200 can determine the generation loss, performance loss, and quality loss by implementing prediction models pre-trained to the task of respectively formulating a generation loss, performance loss, and quality loss.

As shown in block 540, the fine-tuning system 200 updates the generative model based on the generation loss, performance loss, and quality loss. Updating the generative model can be based on reducing the generation loss, performance loss, and quality loss. For example, the fine-tuning system 200 can update model weights of the generative model to reduce the generation loss, performance loss, and quality loss. In some examples, updating the generative model can be based on increasing the generation loss, performance loss, and quality loss. The overall objective represented by computing the generation loss, performance loss, and/or quality loss can be formulated as an objective to increase an associated score for each loss or reduce the loss overall during fine-tuning.

The steps in blocks 510-540 can be iterative and can be performed after a number of training iterations has already occurred, and/or other stopping criteria have been met. After performing the steps in block 510-540 a predetermined number of iterations, the fine-tuning system 200 can output a fine-tuned text to image generative model.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for fine-tuning a text to image generative model comprising:

receiving, by one or more processors, training data;

processing, by the one or more processors, the training data using the generative model to output results;

determining, by the one or more processors, a generation loss, a performance loss, and a quality loss for the generative model based on the results; and updating, by the one or more processors, the generative model based on the generation loss, performance loss, and quality loss.

2. The method of claim 1, wherein the training data comprises pairs of images and text captions.

3. The method of claim 2, wherein processing the training data further comprises:

diffusing the images with noise; and recovering images based on the text captions.

4. The method of claim 3, wherein determining a generation loss, a performance loss, and a quality loss comprises comparing the recovered image with the image received as part of the training data.

5. The method of claim 2, wherein the training data comprises, for at least one pair of an image and a text caption in the training data, a respective threshold generation score, a respective threshold performance score, and a respective threshold quality score.

6. The method of claim 1, further comprising combining, by the one or more processors, the generation loss, performance loss, and quality loss.

7. The method of claim 1, wherein updating the generative model is based on reducing generation loss, performance loss, and quality loss.

8. The method of claim 1, wherein the processing, determining, and updating are iterative.

9. The method of claim 8, wherein the processing, determining, and updating are performed after the generative model is pretrained.

10. The method of claim 8, further comprising, outputting, by the one or more processors, a fine-tuned text to image model after iteratively performing the processing, determining, and updating for a number of iterations.

11. A system comprising:
one or more processors; and
one or more storage devices coupled to the one or more processors and storing instructions that, when executed by the one or more processors, cause the one or more processors to perform operations for method of claim 1.

12. A non-transitory computer readable medium for storing instructions that, when executed by one or more processors, cause the one or more processors to perform operations for the method of claim 1.

\* \* \* \* \*